(12) United States Patent
Mukherjee

(10) Patent No.: US 8,600,825 B2
(45) Date of Patent: Dec. 3, 2013

(54) PAYMENT SERVICE PROVISION WITH REDUCED TRANSACTION COSTS

(75) Inventor: Partha Sarathi Mukherjee, San Jose, CA (US)

(73) Assignee: eBay Inc., San Jose, CA (US)

( * ) Notice: Subject to any disclaimer, the term of this patent is extended or adjusted under 35 U.S.C. 154(b) by 426 days.

(21) Appl. No.: 12/887,233

(22) Filed: Sep. 21, 2010

(65) Prior Publication Data

US 2012/0072306 A1 Mar. 22, 2012

(51) Int. Cl.
*G06Q 30/00* (2012.01)
(52) U.S. Cl.
USPC ........................................ 705/26.1; 705/27.1
(58) Field of Classification Search
USPC ...................................................... 705/26, 27
See application file for complete search history.

(56) References Cited

U.S. PATENT DOCUMENTS

| | | | |
|---|---|---|---|
| 7,346,577 B1* | 3/2008 | Williams et al. | 705/40 |
| 8,117,100 B1* | 2/2012 | Hopkins | 705/34 |
| 2005/0177494 A1* | 8/2005 | Kelly et al. | 705/39 |
| 2006/0273152 A1* | 12/2006 | Fields | 235/380 |
| 2007/0299742 A1* | 12/2007 | Williams et al. | 705/26 |
| 2011/0000962 A1* | 1/2011 | Chan et al. | 235/382 |

OTHER PUBLICATIONS

Javien: "Javien to Earn Micropayment Aggregation Engine Patent," Business Wire Oct. 9, 2007; Dialog file 610 #0001763043, 2pgs.*
Weissman, Dan: "Merchants tap into small-ticket sales: Apple's iPod and iTunes have sent the under-$5 payments arena into overdrive, though profits may be hard to come by. What are the opinions for small-ticket merchants?" Cards & Payments, v18n7p60; Dialog file 16 #12778854, 4pgs.*
Business Wire: "Retail Decisions and I4 Commerce Form Alliance to Provide the Bill Me Later Payment Option for LiveProcessor Users," Business Wire Jul. 1, 2002, Dialog file 610 #00739328, 3pgs.*

* cited by examiner

*Primary Examiner* — Rob Pond
(74) *Attorney, Agent, or Firm* — Haynes and Boone, LLP

(57) ABSTRACT

A method for providing on-line payment services is provided where a payment service provider pays for a plurality of purchases that are made by a user during a plurality of on-line shopping sessions. An authorization is received for the payment service provider to collect a reimbursement amount from a financial institution of the user. The reimbursement amount is at least equal to a cumulative amount of the payments for the plurality of purchases made by the user during the plurality of on-line shopping sessions. The payment service provider collects the reimbursement amount in a single transaction from the financial institution of the user and pays a fee to the financial institution of the user. The fee is based on the single transaction carried out to collect the reimbursement amount rather than being applied to each of the plurality of purchases or assessed as a percentage of the reimbursement amount, which allows the payment service provider to reduce the costs associated with providing payment services.

20 Claims, 4 Drawing Sheets

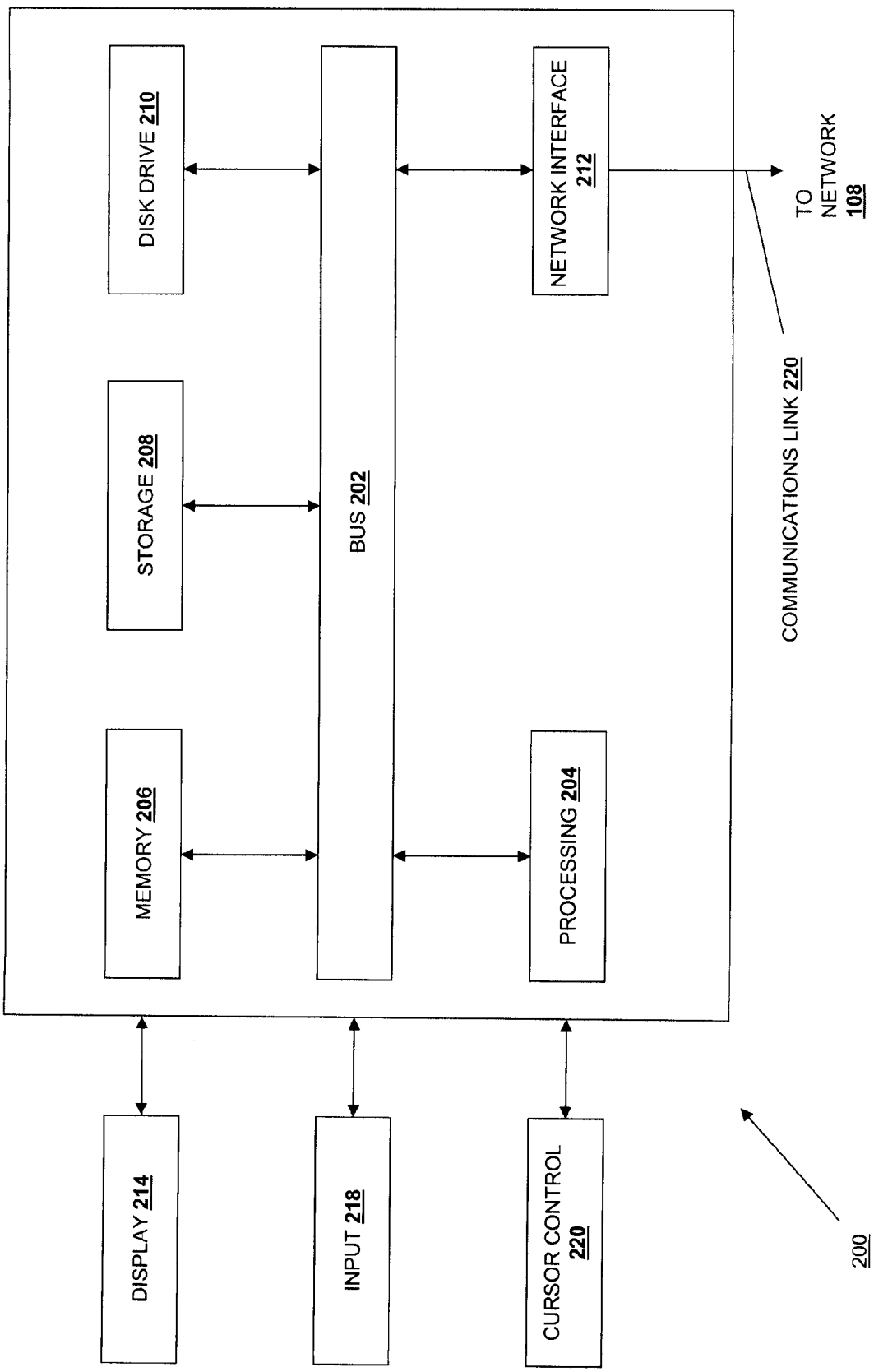

PAYMENT SERVICE PROVISION WITH REDUCED TRANSACTION COSTS

BACKGROUND

1. Field of the Invention

The present invention generally relates to on-line payments and more particularly to a system for on-line payment provision that reduces transaction costs for a payment service provider.

2. Related Art

More and more consumers are purchasing items and services over electronic networks such as, for example, the Internet. Consumers routinely search for and purchase products and services from merchants and individuals alike. The transactions may take place directly between an on-line merchant/retailer/individual and the consumer, and payment is typically made by entering credit card or other financial information. Transactions may also take place with the aid of an on-line payment service provider such as, for example, PayPal, Inc. of San Jose, Calif. Such payment service providers can make transactions easier and safer for the parties involved. Purchasing through the Internet from the convenience of a consumer's home, office, or virtually anywhere (with mobile devices) is one main reason why on-line purchases are growing very quickly.

However, the provision of payment services can raise a number of issues. A payment service provider may provide payment services to a number of consumers, and each consumer may regularly use the payment service provider to make payments for purchases. For example, each consumer may use the payment service provider to make payments for purchases several times per month. When the consumers use the payment service provider to make the payment, the payment service provider pays the merchant or individual with whom the purchase was made, and the merchant or individual then pays the payment service provider a fee for the payment service provided. The payment service provider then requests and collects a reimbursement for that payment from a financial institution of the consumer. However, the payment service provider must also pay a fee to the financial institution from which the reimbursement is collected. When this scenario is repeated several time per month for each purchase made by each consumer, these fees paid to the financial institutions from the payment service provider are incurred for each purchase, which adds significant costs to the provision of the on-line payment service. These costs are exacerbated when particular financial institutions that charge higher fees are used for reimbursement for purchases.

Thus, there is a need for an improved system for on-line payment service provision.

SUMMARY

According to one embodiment, a method for providing on-line payment services includes paying, by a payment service provider over a network, for a plurality of purchases that are made, by a user through at least one user device over the network, during a plurality of on-line shopping sessions; receiving, by the payment service provider from the user through the at least one user device over the network, an authorization to collect a reimbursement amount from a financial institution of the user, wherein the reimbursement amount is at least equal to a cumulative amount of the payments for the plurality of purchases made by the user during the plurality of on-line shopping sessions; collecting the reimbursement amount in a single transaction, by the payment service provider from the financial institution of the user over the network; and paying a fee, by the payment service provider to the financial institution of the user over the network, that is based on the single transaction carried out to collect the reimbursement amount.

In an embodiment, the fee that is based on the single transaction carried out to collect the reimbursement amount is less than a cumulative amount of conventional fees that would be applied to each of the plurality of purchases or a fee amount that is assessed as a percentage of the reimbursement amount.

As a result, the transaction costs associated with providing payment services are reduced for the payment service provider.

These and other features and advantages of the present disclosure will be more readily apparent from the detailed description of the embodiments set forth below taken in conjunction with the accompanying drawings.

BRIEF DESCRIPTION OF THE FIGURES

FIG. 1b is a schematic view illustrating an embodiment of a payment service provider involved in the networked system of FIG. 1a;

FIG. 2 is a schematic view illustrating an embodiment of a computer system used in the networked system of FIG. 1a and the payment service provider of FIG. 1b.

Figure 1A:
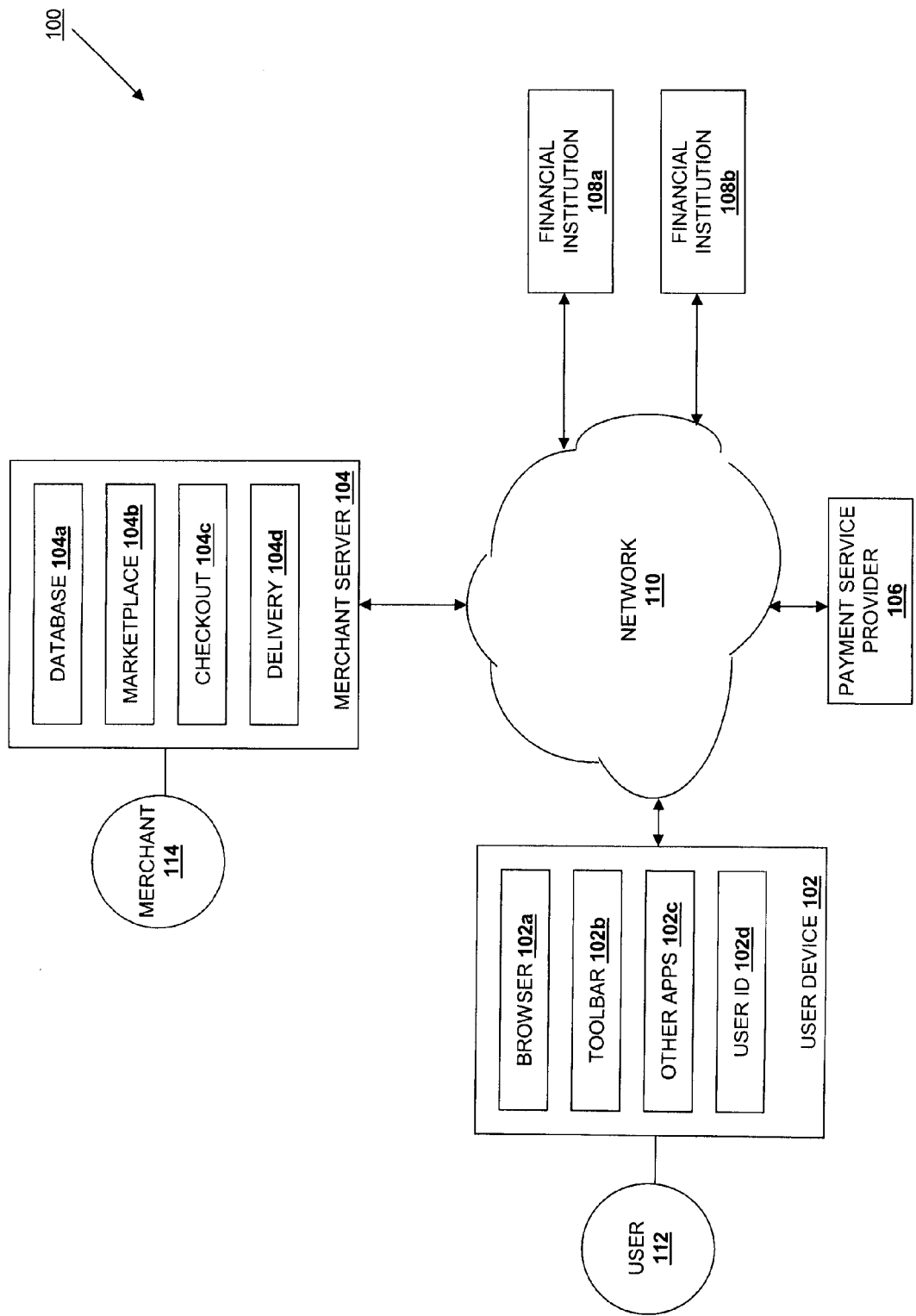
FIG. 1a is a view illustrating an embodiment of a networked system.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Referring now to FIG. 1a, an embodiment of a networked system 100 used to make on-line payments is illustrated. The networked system 100 includes a user device 102, a merchant server 104, a payment service provider 106, and a plurality of financial institutions 108a and 108b in communication over a network 110. The payment service provider 106 may be a payment service provider such as, for example, PayPal Inc. of San Jose, Calif. The financial institutions 108a and 108b may be, for example, banking financial institutions that provide banking products and services such as checking accounts, savings accounts, debit cards, and/or a variety of other banking products and services known in the art; credit financial institutions that provide credit products and services such as lines of credit (e.g., credit cards), loans, and/or a variety of other credit product and services known in the art; and/or a variety of other financial institutions known in the art.

The user device 102, merchant server 104, and components of the payment service provider 106 and/or the financial institutions 108a and 108b (discussed in further detail below) may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 100, and/or accessible over the network 110.

The network 110 may be implemented as a single network or a combination of multiple networks. For example, in various embodiments, the network 110 may include the Internet and/or one or more intranets, landline networks, wireless networks, and/or other appropriate types of networks.

The user device 102 may be implemented using any appropriate combination of hardware and/or software configured for wired and/or wireless communication over the network 110. For example, in one embodiment, the user device 102 may be implemented as a personal computer of a user 112 in communication with the Internet. In other embodiments, the user device 102 may be a smart phone, personal digital assistant (PDA), laptop computer, and/or other types of computing devices.

As shown, the user device 102 may include one or more browser applications 102a which may be used, for example, to provide a convenient interface to permit the user 112 to browse information available over the network 110. For example, in one embodiment, the browser application 102a may be implemented as a web browser configured to view information available over the Internet.

The user device 102 may also include one or more toolbar applications 102b which may be used, for example, to provide user-side processing for performing desired tasks in response to operations selected by the user 112. In one embodiment, the toolbar application 102b may display a user interface in connection with the browser application 102a.

The user device 102 may further include other applications 102c as may be desired in particular embodiments to provide desired features to the user device 102. In particular, the other applications 102c may include a payment application for payments through the payment service provider 106. The other applications 102c may also include security applications for implementing user-side security features, programmatic user applications for interfacing with appropriate application programming interfaces (APIs) over the network 110, or other types of applications. Email and/or text applications may also be included, which allow the user 112 to send and receive emails and/or text messages through the network 110. The user device 102 includes one or more user and/or device identifiers 102d which may be implemented, for example, as operating system registry entries, cookies associated with the browser application 102a, identifiers associated with hardware of the user device 102, or other appropriate identifiers, such as a phone number. In one embodiment, the user identifier 102d may be used by the payment service provider 106 to associate the user 112 with a particular account maintained by the payment service provider 106 as further described herein.

The merchant server 104 may be maintained, for example, by an on-line merchant, digital goods seller, individual seller, and/or application developer offering various products and/or services in exchange for payment to be received over the network 110, including digital goods and applications. In this regard, the merchant server 104 includes a database 104a identifying available products and/or services (e.g., collectively referred to as items) which may be made available for viewing and purchase by the user 112. Accordingly, the merchant server 104 also includes a marketplace application 104b which may be configured to provide information over the network 110 to the browser 102a of the user device 102. For example, in one embodiment, the user 112 may interact with the marketplace application 104b through the browser application 102a over the network 110 in order to search and view various items identified in the database 104a.

The merchant server 104 also includes a checkout application 104c which may be configured to facilitate the purchase by the user 112 of items identified by the marketplace application 104b. The checkout application 104c may be configured to accept payment information from the user 112 and/or from the payment service provider 106 over the network 110.

In one embodiment, the merchant server 104 further includes a delivery application 104d which may be configured to deliver a digital or downloadable item to the user device 102. For example, if the user 112 purchases a downloadable item or enhancement from a merchant 114 through the merchant server 104, the delivery application 104d has the ability to transmit or download the item onto the user device 102 or allow additional access to the user 112 after payment is confirmed (e.g., by the payment service provider 106.)

Figure 1B:
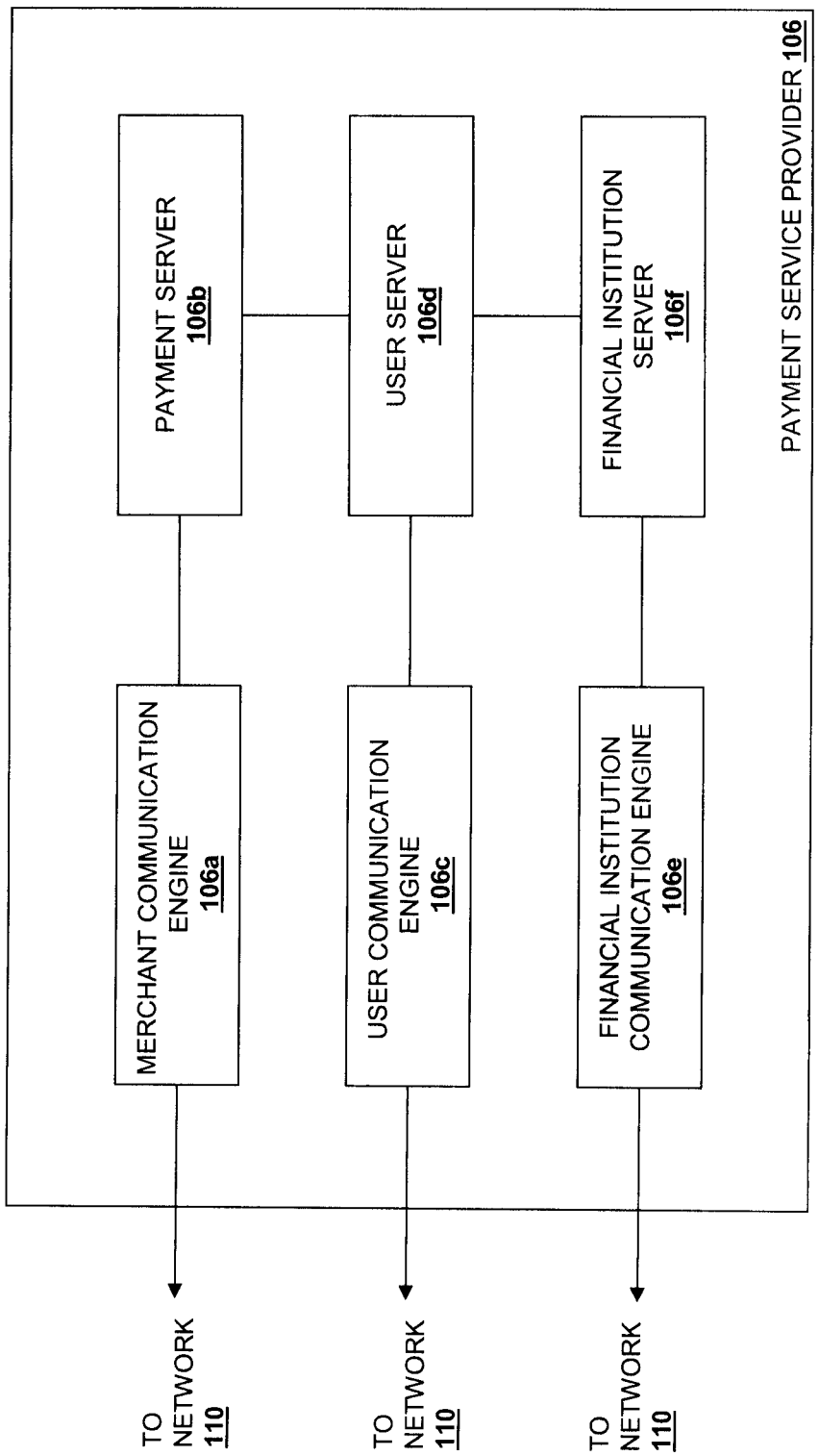

Referring now to FIGS. 1a and 1b, an embodiment of the payment service provider 106 is illustrated in more detail. A merchant communication engine 106a which may be, for example, software stored on a computer-readable medium, is included in the payment service provider 106 and is operably coupled to the network 110 and a payment server 106b in order to communicate with, for example, the merchant 114 through the merchant server 104 and transfer information between the merchant server 104 and the payment server 106b. In an embodiment, the payment server 106b includes computer-readable media, databases, and other computing components known in the art that allow the payment server 106b to record and manage the details of on-line sessions with merchants such as, for example, the merchant 114, that are conducted through the network 110 with the payment service provider 106. In an embodiment, the merchant communication engine 106a and the payment server 106b may be combined into a single component of the payment service provider 106 rather than separate components as illustrated in FIG. 1b.

A user communication engine 106c which may be, for example, software stored on a computer-readable medium, is included in the payment service provider 106 and is operably coupled to the network 110 and a user server 106d in order to communicate with, for example, the user 112 through the user device 102 and transfer information between the user device 102 and the user server 106d. In an embodiment, the user server 106d includes computer-readable media, databases, and other computing components known in the art that allow the user server 106d to record and manage the details of on-line sessions with users such as, for example, the user 112, that are conducted through the network 110 with the payment service provider 106. In an embodiment, the user communication engine 106c and the user server 106d may be combined into a single component of the payment service provider 106 rather than separate components as illustrated in FIG. 1b.

A financial institution communication engine 106e which may be, for example, software stored on a computer-readable medium, is included in the payment service provider 106 and is operably coupled to the network 110 and a financial institution server 106f in order to communicate with, for example, the financial institutions 108a and 108b and transfer information between the financial institutions 108a and 108b and the financial institution server 106f. In an embodiment, the financial institution server 106f includes computer-readable media, databases, and other computing components known in the art that allow the financial institution server 106f to record and manage the details of on-line sessions with financial institutions such as, for example, the financial institutions 108a and/or 108b, that are conducted through the network 110 with the payment service provider 106. In an embodiment, the financial institution communication engine 106e and the financial institution server 106f may be combined into a single component of the payment service provider 106 rather than separate components as illustrated in FIG. 1b. Furthermore, any or all of the merchant communication engine 106a, the user communication engine 106c, the financial institution communication engine 106e, the payment service 106b, the user server 106d, and/or the financial institution server 106f may be combined into one or more components of the payment service provider 106 rather than existing as separate components as illustrated in FIG. 1b.

Referring now to FIG. 2, an embodiment of a computer system 200 suitable for implementing one or more embodiments of the present disclosure is illustrated. In various implementations, the user device 102 may comprise a computing device (e.g., a computer, laptop, smart phone, PDA, etc.) capable of communicating with the network 110. The merchant server 104, payment server 106b, user server 106d, financial institution server 106f, servers located in the financial institutions 108a and/or 108b, and/or other components of the system 100 may utilize a network computing device (e.g., a network server) capable of communicating with the network 110. It should be appreciated that each of the devices utilized by users, merchants, payment providers, and financial institutions may be implemented as the computer system 200 in a manner as follows.

In accordance with various embodiments of the present disclosure, computer system 200, such as a computer and/or a network server, includes a bus 202 or other communication mechanism for communicating information, which interconnects subsystems and components, such as a processing component 204 (e.g., processor, micro-controller, digital signal processor (DSP), etc.), a system memory component 206 (e.g., RAM), a static storage component 208 (e.g., ROM), a disk drive component 210 (e.g., magnetic or optical), a network interface component 212 (e.g., modem or Ethernet card), a display component 214 (e.g., CRT or LCD), an input component 218 (e.g., keyboard, keypad, or virtual keyboard), and a cursor control component 220 (e.g., mouse, pointer, or trackball). In one implementation, the disk drive component 210 may comprise a database having one or more disk drive components.

In accordance with embodiments of the present disclosure, the computer system 200 performs specific operations by the processor 204 executing one or more sequences of instructions contained in system the memory component 206, such as described herein with respect to the user 112, the merchant 114, the payment service provider 106, and/or the financial institutions 108a and 108b. Such instructions may be read into the system memory component 206 from another computer readable medium, such as the static storage component 208 or the disk drive component 210. In other embodiments, hard-wired circuitry may be used in place of or in combination with software instructions to implement the present disclosure.

Logic may be encoded in a computer readable medium, which may refer to any medium that participates in providing instructions to the processor 204 for execution. Such a medium may take many forms, including but not limited to, non-volatile media, volatile media, and transmission media. In various implementations, non-volatile media includes optical or magnetic disks, such as the disk drive component 210, volatile media includes dynamic memory, such as the system memory component 206, and transmission media includes coaxial cables, copper wire, and fiber optics, including wires that comprise the bus 202. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by the computer system 200. In various other embodiments of the present disclosure, a plurality of the computer systems 200 coupled by a communication link 220 to the network 110 (e.g., such as a LAN, WLAN, PTSN, and/or various other wired or wireless networks, including telecommunications, mobile, and cellular phone networks) may perform instruction sequences to practice the present disclosure in coordination with one another.

The computer system 200 may transmit and receive messages, data, information and instructions, including one or more programs (i.e., application code) through the communication link 220 and the network interface component 212. The network interface component 212 may include an antenna, either separate or integrated, to enable transmission and reception via the communication link 220. Received program code may be executed by processor 204 as received and/or stored in disk drive component 210 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Figure 3:
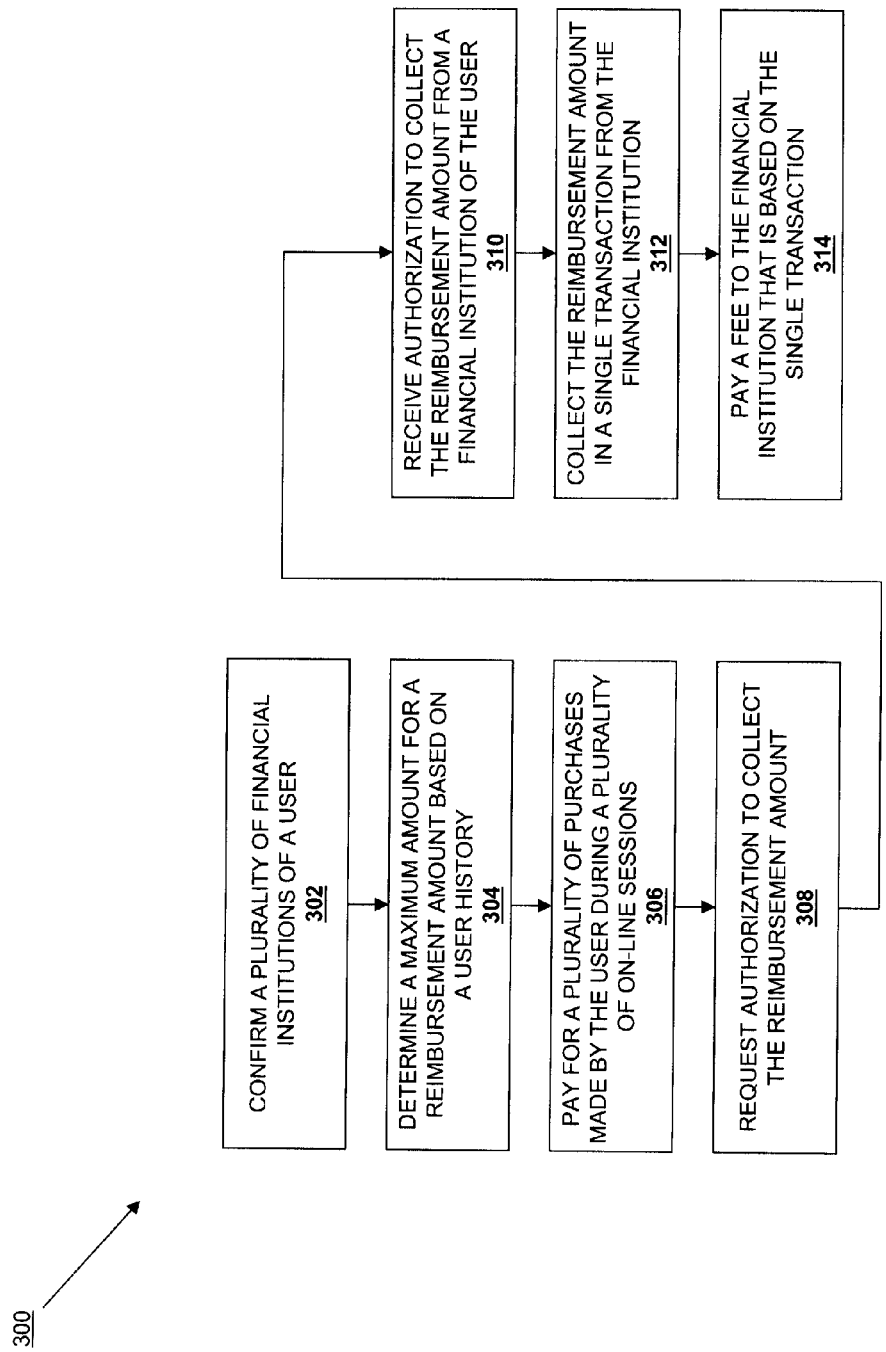
FIG. 3 is a flow chart illustrating an embodiment of a method for providing on-line payment services.

Referring now to FIG. 3, a method 300 for providing online payment services is illustrated. The method 300 begins at block 302 where a plurality of financial institutions of a user are confirmed. In an embodiment, the user 112 has (or creates) a user account with the payment service provider 106 that may be stored in the user server 106d. The user 112 may use the user account to have the payment service provider 106 make payments for purchases from third parties such as, for example, the merchant 114. In an embodiment, in order to have the user account, the user 112 has provided (e.g., through the user communication engine 106c) the payment service provider 106 authorization, access, and/or a variety of other permissions known in the art, to at least one financial institution (e.g., the financial institutions 108a and/or 108b) of the user 112 in order to collect reimbursements for purchases made by the user 112 and paid for by the payment service provider 106. In turn, the payment service provider 106 has confirmed (e.g., using the financial institution communication engine 106e) the at least one financial institution of the user 112 by ensuring that the user 112 is associated with the financial institution, that the user 112 is in good standing with the financial institution, and/or a variety of other confirmation methods known in the art.

The payment service provider 106 may store any authorizations, access, and/or other permissions to access the financial institutions of the user 112 in the financial institutions server 106f. In an embodiment, in order to participate in the method 300, the user 112 must provide, and the payment service provider 106 must confirm, a plurality of financial institutions of the user 112. For example, in order to participate in the method 300, the user 112 must provide, and the payment service provider 106 must confirm, a primary financial institution of the user 112 (e.g., a banking financial institution) and a secondary financial institution of the user 112 (e.g., a credit financial institution.) In an embodiment, the secondary financial institution must provide a guaranteed source of funds such as, for example, a line of credit that the payment service provider 106 may collect the reimbursement amount from in response to the user 112 not having sufficient funds at the primary financial institution, discussed in further detail below.

The method 300 then proceeds to block 304 where a maximum amount for a reimbursement amount is determined based on a user history. Information related to the user account of user 112, discussed above, may be stored on the user server 106d in the payment service provider 106. In an embodiment, information related to the user account of the user 112 may include information related to one or more financial institutions of the user 112 such as, for example, the financial institutions 108a and 108b; information related to any or all purchases made by the user 112 and paid for using the payment service provider 106 (i.e., a purchase history of the user involving the payment service provider 106); information related to any or all reimbursements collected by the payment service provider 106 for purchases made by the user 112 (i.e., a reimbursement history for the payment service provider 106 with the financial institutions of the user 112); and/or a variety of other payment service user account information known in the art. While the method 300 is described below with reference to one or more financial institutions of the user 112, one of skill in the art will recognize that the financial institutions of the user 112 may include financial institutions associated with the user 112 such as, for example, a parent's banking and/or credit financial institution associated with their child user, a spouse's banking and/or credit financial institution associated with their spouse user, and/or a variety of other scenarios known in the art.

In an embodiment, a user history of the user 112 may include some or all of the information related to the user account of the user 112 discussed above, and may also include other user related credit and/or risk information related to the user 112 such as, for example, a credit score of the user 112, a debt report of the user 112, and/or a variety of other credit and/or risk information known in the art. At block 302 of the method 300, the payment service provider 106 may review the user history of the user 112 and, using credit and risk methods known in the art, use that user history of the user 112 to determine a maximum amount of a reimbursement amount (discussed in further detail below) that is related to a cumulative amount of payments that will be made by the payment service provider 106 for a plurality of purchases that are made by the user 112 prior to collecting a reimbursement amount. In an embodiment, the maximum amount of the reimbursement amount is stored in the user server 106d.

For example, the user history of the user 112 may indicate that the user 112 has made no more than $200 of purchases each month for the prior two year that have been paid for using the payment service provider 106 and the payment service provider 106 has never been denied a reimbursement from a financial institution of the user 112, and thus the maximum amount of the reimbursement amount may be determined to be $200. In another example, the user history of the user 112 may indicate that the user 112 has made approximately $1000 in purchases each month for the last 3 years that have been paid for using the payment service provider 106 and has also held an average account balance (e.g., a checking account balance) at a financial institution of the user 112 of approximately $5000 in each month of the past 3 years, and thus the maximum amount of the reimbursement amount may be determined to be $1000. While a plurality of examples of the use of the user history to determine the maximum amount of the reimbursement amount have been described, one of skill in the art will recognize that the user history may be used in a variety of other ways to determine the maximum amount of the reimbursement amount without departing from the scope of the present disclosure.

The method 300 then proceeds to block 306 where a plurality of purchases that are made by the user during a plurality of on-line sessions are paid for. In an embodiment, the user 112, described above with reference to FIG. 1a, is involved in a plurality of on-line shopping sessions using the user device 102, the network 110, and one or more merchant servers such as, for example, the merchant server 104, all described above with reference to FIGS. 1a and 2. For example, the user 112 may use the browser application 102a to connect to one or more marketplace applications (e.g., the market application 104b on the merchant server 104) through the network 110 and shop the one or more marketplace applications for items included in databases (e.g., the database 104a), as is known in the art. As is also known in the art, the user 112 may use the browser application 102a to select one or more items that the user 112 wishes to purchase. In an embodiment, when the user 112 finishes each on-line shopping session, the user 112 may be connected, through the network 110, to a checkout application (e.g., the checkout application 104c on the merchant server 104) in order to provide payment for any items selected during each on-line shopping session.

Thus, the plurality of on-line shopping sessions may include the user 112 using the user device 102 to first connect through the network 110 to a plurality of different merchant servers, then purchase at least one item from a plurality of different merchants, and then disconnect from the network 110. The plurality of on-line shopping sessions may also include the user 112 using the user device 112 to first connect through the network 110 to a first merchant server, then purchase at least one item from a first merchant, then disconnect from the network 110, then reconnect through the network 110 to either the first merchant server or a second merchant server (e.g., a timer period after the previous disconnection from the network 110, after logging out of the network 110 or the first merchant server, etc.), then purchase at least one item from the first merchant or a second merchant, and then disconnect from the network 110. While the plurality of on-line shopping sessions have been described above as involving the user 112 connecting to one or more merchant servers, one of skill in the art will recognize that the present disclosure is not so limited, and that a variety of different on-line shopping sessions known in the art fall within its scope.

In an embodiment, in order to provide payment for any items selected during any of the plurality of on-line shopping sessions, the user 112 may use the user account of the user 112 with the payment service provider 106, discussed above, such that the payment service provider 106 may provide payment to the merchant 114 (though, e.g., communication between the merchant communication engine 106a and the checkout application 104c over the network 110) for any items selected by the user 112 during the plurality of on-line shopping sessions. For example, the user 112 may begin a first on-line shopping session by connecting to a merchant server over the network 110, selecting at least one item to purchase, and then using the user account such that the payment service provider 106 provides payment for the at least one item, as discussed above. The user 112 may then disconnect from the merchant server and either reconnect to that merchant server (e.g., at a later time) or connect to a different merchant server over the network 110, select at least one item to purchase, and use the user account such that the payment service provider 106 provides payment for the at least one item. This process may be repeated a plurality of times such that the payment service provider 106 pays for a plurality items purchased by the user 112 during a plurality of on-line shopping sessions. Data related to payments made by the payment service provider 106 to one or more merchants may be stored on the payment server 106b.

In conventional payment provision services, after a payment service provider pays a merchant for an item purchased by a user, the payment service provider then collects a reimbursement from a financial institutions of the user. However, some financial institutions such as, for example, banking financial institutions, charge a fee (e.g., $0.40) for each transaction that is carried out between the payment service provider and the financial institution to collect a reimbursement. Thus, when a user purchases at least one item during each of a plurality of on-line shopping sessions and pays for those purchases using the payment service provider, and the payment service provider then collects reimbursements for the payments made for the purchases in each on-line shopping session in separate transactions with the financial institution, the payment service provider must pay a fee for each transaction carried out to collect the reimbursements. Thus, the more often the user makes purchases in different on-line shopping sessions, the more fees the payment service provider must pay to the financial institution for collecting reimbursements for the payment of those purchases in separate transactions.

However, according to the present disclosure, the payment service provider 106 does not collect a reimbursement from the financial institution of the user 112 for payments made each time the user 112 makes a purchase in an on-line shopping session. Rather, each time a payment is made by the payment service provider 106 (e.g., though communication between the merchant communication engine 106a and the checkout application 104c over the network 110), that payment is recorded in the merchant server 106b and/or the user server 106d. In an embodiment, a balance amount for the user 112 is stored in the user server 106d. In an embodiment, the balance amount may include any payments made by the payment service provider 106 for which the payment service provider 106 has not yet been reimbursed. In an embodiment, the balance amount may be updated each time the payment service provider 106 makes a payment for a purchase made by the user 112.

Before making a payment to a merchant for a purchase made by the user 112, the payment service provider 106 may check (e.g., through communication between the payment server 106b and the user server 106d) the balance amount to determine whether the balance amount exceeds the maximum amount for the reimbursement amount, discussed above, or to determine whether the requested payment will cause the balance amount to exceed the maximum amount for the reimbursement amount and, if so, the payment service provider 106 may, for example, not make the payment to the merchant or require an immediate reimbursement from one of the financial institutions of the user 112. Thus, at block 306 of the method 300, the payment service provider 106 makes payments to one or more merchants for purchases made by the user 112 over a plurality of on-line shopping sessions, updates a balance amount for the user 112, but does not collect a reimbursement from a financial institution of the user 112.

The method 300 then proceeds to blocks 308 and 310 where authorization to collect a reimbursement amount is requested and received. In an embodiment, at any given time, the reimbursement amount may be the current balance amount of the user 112, discussed above, and may include a cumulative amount of the payments made by the payment service provider 106 for purchases made by the user 112 over the plurality of on-line shopping sessions that the payment service provider 106 has not yet been reimbursed for. For example, the reimbursement amount may be at least equal to the cumulative amount of the payments made by the payment service provider 106 for the plurality of purchases made by the user 112 during the plurality of on-line shopping sessions. In an embodiment, the reimbursement amount is a percentage of the current balance amount of the user 112.

In an embodiment, the payment service provider 106 requests authorization from the user 112 (e.g., through the user communication engine 106c and the user device 102 over the network 110) to collect a reimbursement amount from a financial institution of the user 112, and the user 112 provides that authorization to the payment service provider 106. In an embodiment, the authorization to collect the reimbursement amount may be requested prior to the user 112 making the plurality of purchases. For example, the payment service provider 106 may request and the user 112 may provide authorization to collect any reimbursement amount from a financial institution of the user 112 at block 302 of the method 300. In another embodiment, the authorization to collect the reimbursement amount may be requested subsequent to the user 112 making the plurality of purchases. For example, the payment service provider 106 may send the user 112 a list of all payments made by the payment service provider 106 for purchases made by the user 112 over the plurality of on-line shopping sessions that the payment service provider 106 has not been reimbursed for, and the user 112 may be prompted to provide authorization for the payment service provider 106 to collect a reimbursement from the financial institution of the user 112 for some or all of those payments made.

The method 300 then proceeds to block 312 of the method 300 where the reimbursement amount is collected from the financial institution of the user in a single transaction. The payment service provider 106 communicates with the financial institution of the user 112 (e.g., through communication between the financial institution communication engine 106e and the financial institution over the network 108) to request and collect the reimbursement amount from the financial institution in a single transaction. In an embodiment, the collection of the reimbursement amount in block 312 of the method 300 is performed in response to the reimbursement amount exceeding a maximum amount. For example, the maximum amount for the reimbursement amount, discussed above with reference to block 304 of the method 300, may be $200, and the payment service provider 106 may initiate the collection of the reimbursement amount (e.g., request authorization or use a previously provided authorization) in response to the balance amount of the user 112, discussed above, exceeding $200. In another example, the payment service provider 106 may initiate the collection of the reimbursement amount upon determining that the balance amount for the user 112, discussed above, is within a predetermined amount of the maximum amount for the reimbursement amount (e.g., within $20 of the $200 maximum amount discussed above).

In an embodiment, the collection of the reimbursement amount in block 312 of the method 300 is performed in response to the expiration of a predetermined amount of time. For example, the payment service provider 106 may initiate the collection of the reimbursement amount once a week, once a month, once every several months, etc. In an embodiment, the user 112 may be required to authorize the collection of the entire amount of the cumulative current balance of the user 112 at the end of each month period specified by the payment service provider 106. Thus, in an embodiment, the payment service provider 106 collects the reimbursement amount from the financial institution in a single transaction by submitting the reimbursement amount which, as described above, may be the current balance amount of the user 112 and may include a cumulative amount of the payments made by the payment service provider 106 for purchases made by the user 112 over the plurality of on-line shopping sessions for which the payment service provider 106 has not been reimbursed for, to the financial institution for reimbursement. In an embodiment, if the reimbursement amount collected from a first financial institution of the user 112 is a percentage of the cumulative amount of the payments made by the payment service provider 106 for purchases made by the user 112 over the plurality of on-line shopping sessions for which the payment service provider 106 has not been reimbursed for, the payment service provider 106 may attempt to collect or collect the remaining percentage of the cumulative amount of the payments made by the payment service provider 106 for purchases made by the user 112 over the plurality of on-line shopping sessions for which the payment service provider 106 has not been reimbursed for from a second financial institution of the user 112.

The method 300 then proceeds to block 314 where a fee is paid to the financial institution that is based on the single transaction. In an embodiment, in response to submitting the reimbursement amount to the financial institution for reimbursement in a single transaction, the payment service provider 106 is charged for and pays a fee that is based on the single transaction. As discussed above, some financial institutions such as, for example, banking financial institutions, charge a fee (e.g., $0.40) for each transaction that is carried out between the payment service provider and the financial institution to collect a reimbursement. By not collecting a reimbursement for each payment made for a plurality of purchases made by a user 112 over a plurality of on-line shopping sessions, but rather collecting the reimbursement amount that includes all of the plurality of purchases made by the user 112 over the plurality of on-line shopping sessions, the payment service provider pays the fee to the financial institution for the single transaction rather than paying the fee for each of the plurality of transactions. Thus, in an embodiment, the single transaction that is carried out for the payment service provider 106 to submit and collect the reimbursement amount is a transaction with the financial institution that incurs only one fee from the financial institution. In another embodiment, the single transaction that is carried out for the payment service provider 106 to submit and collect the reimbursement amount is a transaction in which the payment service provider 106 submits a single amount (e.g., the reimbursement amount for the plurality of payments made by the payment service provider 106 for the plurality of purchases made by the user 112 over the plurality of on-line shopping sessions) for reimbursement and collects that single amount from the financial institution of the user 112.

Referring back to block 312 of the method 300, in an embodiment, the submission by payment service provider 106 for the reimbursement amount to the financial institution of the user 112 for collection may be denied by the financial institution (e.g., because the user has insufficient funds with that financial institution to cover the reimbursement amount.) As discussed above for a particular embodiment, in order to participate in the method 300, the user 112 must provide and the payment service provider 106 must confirm a primary financial institution of the user 112 (e.g., a banking financial institution) and a secondary financial institution of the user 112 (e.g., a credit financial institution.) So in an example, the user 112 may have insufficient funds in a banking financial institution such that the collection of the reimbursement amount by payment service provider 106 from that banking financial institution may be denied. The payment service provider 106 may collect the reimbursement amount from credit financial institution of the user 112 which, as discussed above, may be guaranteed source of funds such as a line of credit. Typically, credit financial institutions charge a fee that is a percentage (e.g., 2.4%) of the amount of a given transaction.

In an embodiment, the payment service provider 106 may charge the user 112 a collection denied fee or a secondary financial institution fee when the banking financial institution denies the collection of the reimbursement amount. In an embodiment, the collection denied fee or secondary institution fee may cover the fee from the credit financial institution. In an embodiment, the collection denied fee or secondary financial institution fee may be authorized at block 302 of the method 300. In an embodiment, the collection denied fee may be a percentage of the fee from the credit financial institution. Credit financial institutions also typically do not allow the grouping or lumping of multiple transaction for reimbursement. However, in the case where the banking financial institution has denied the collection of the reimbursement amount, the reimbursement amount may be re-classified to the credit financial institution as an 'overdraft' such that the payments for the plurality of purchases made by the user 112 over the plurality of on-line shopping sessions may be grouped together into the reimbursement amount and collected from the credit financial institution. In an embodiment, if the payment service provider 106 cannot collect a reimbursement amount from any financial institution of the user 112, the user 112 may be disqualified from participating in the method 300 in the future such that the payment service provider 106 will no longer make payments for a plurality of purchases made by the user 112 in a plurality of on-line shopping sessions without seeking reimbursement.

Thus, a system and method have been described in which a payment service provider pays for a plurality of purchases made by a user over a plurality of on-line sessions without immediately seeking reimbursement for those payments from a financial institution of the user. The payment service provider then collects a reimbursement amount, in a single transaction from the financial institution of the user, that includes a cumulative amount of the plurality of payments made by the payment service provider for the plurality of purchases made by a user over the plurality of on-line sessions. The collecting of this reimbursement amount in a single transaction incurs only a single transaction fee rather than a transaction fee for each of the plurality of purchases made, which results in a significant savings for the payment service provider, particularly when the user makes a plurality of purchases for relatively small amounts.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and seller; however, a user or consumer can pay virtually, or otherwise interact with any type of recipient, including charities and individuals. The payment does not have to involve a purchase, but can be a loan, a charitable contribution, a gift, etc. Thus, merchant as used herein can also include charities, individuals, and any other entity or person receiving a payment from a user. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method for providing on-line payment services, comprising:
   transmitting payments, by a payment service provider over a network to at least one merchant, for a plurality of purchases that are made, by a user through at least one user device over the network, during a plurality of on-line shopping sessions;
   receiving, by the payment service provider from the user through the at least one user device over the network, an authorization to collect a reimbursement amount from a first financial institution of the user, wherein the reimbursement amount is at least equal to a portion of a cumulative amount of the payments transmitted by the payment service provider to the at least one merchant for the plurality of purchases made by the user during the plurality of on-line shopping sessions;
   attempting to collect the reimbursement amount in a single transaction, by the payment service provider from the first financial institution of the user over the network, subsequent to the transmitting of the payments by the payment service provider to the at least one merchant for the plurality of purchases made by the user during the plurality of on-line shopping sessions;
   receiving, in response to attempting to collect the reimbursement amount from the first financial institution, a collection denial from the first financial institution over the network;
   reclassifying the reimbursement amount in response to the collection denial to create a reclassified reimbursement amount that is associated with insufficient funds at the first financial institution;
   collecting the reclassified reimbursement amount in a single transaction, by the payment service provider from second financial institution of the user over the network, wherein the second financial institution is a credit financial institution;
   paying a fee, by the payment service provider to the second financial institution of the user over the network, that is based on the single transaction carried out to collect the reclassified reimbursement amount.

2. The method of claim 1, further comprising:
   reviewing a user history; and
   determining a maximum amount for the reimbursement amount, wherein payments by the payment service provider to the at least one merchant for the plurality of purchases that are made by the user during the plurality of on-line shopping sessions are not transmitted if those payments will cause the reimbursement amount to exceed the maximum amount, and wherein the maximum amount is based on the user history.

3. The method of claim 1, wherein the transmitting payments to the at least one merchant by the payment service provider for the plurality of purchases that are made by the user during the plurality of on-line shopping sessions requires a prior authorization, received from the user through the at least one user device over the network prior to the plurality of purchases being made, to collect the reclassified reimbursement amount from the second financial institution of the user in response to the user not having sufficient funds at the first financial institution of the user.

4. The method of claim 3, wherein the first financial institution of the user comprises a banking financial institution.

5. The method of claim 3, wherein the prior authorization, received from the user through the user device over the network prior to the plurality of purchases being made, to collect the reclassified reimbursement amount from the second financial institution of the user in response to the user not having sufficient funds at the first financial institution of the user further comprises a prior authorization to collect the reclassified reimbursement amount and a second financial institution fee from the second financial institution of the user in response to the user not having sufficient funds at the first financial institution of the user.

6. The method of claim 1, wherein the attempting to collect the reimbursement amount is in response to the reimbursement amount exceeding a maximum amount.

7. The method of claim 1, wherein the attempting to collect the reimbursement amount is in response to the expiration of a predetermined amount of time.

8. The method of claim 1, wherein the authorization to collect the reimbursement amount is received prior to the plurality of purchases being made.

9. A machine-readable medium comprising a plurality of machine-readable instructions which, when executed by one or more processors of one or more servers, are adapted to cause the one or more servers to perform a method, comprising:
   transmitting payments to at least one merchant for a plurality of purchases that are made by a user during a plurality of on-line shopping sessions;
   receiving an authorization to collect a reimbursement amount from a first financial institution of the user, wherein the reimbursement amount is at least equal to a portion of a cumulative amount of the payments transmitted to the at least one merchant for the plurality of purchases made by the user during the plurality of on-line shopping sessions;
   attempting to collect the reimbursement amount in a single transaction from the first financial institution of the user subsequent to the transmitting of the payments to the at least one merchant for the plurality of purchases made by the user during the plurality of on-line shopping sessions;

receiving, in response to attempting to collect the reimbursement amount from the first financial institution, a collection denial from the first financial institution;

reclassifying the reimbursement amount in response to the collection denial to create a reclassified reimbursement amount that is associated with insufficient funds at the first financial institution;

collecting the reclassified reimbursement amount in a single transaction by the payment service provider from second financial institution of the user, wherein the second financial institution is a credit financial institution;

paying a fee to the second financial institution of the user that is based on the single transaction carried out to collect the reclassified reimbursement amount.

10. The machine-readable medium of claim 9, wherein the plurality of machine-readable instructions, when executed by one or more processors of one or more servers, are adapted to cause the one or more servers to perform the method, further comprising:

reviewing a user history; and determining a maximum amount for the reimbursement amount, wherein payments to the at least one merchant for the plurality of purchases that are made by the user during the plurality of on-line shopping sessions are not transmitted if those payments will cause the reimbursement amount to exceed the maximum amount, and wherein the maximum amount is based on the user history.

11. The machine-readable medium of claim 9, wherein the transmitting payments to the at least one merchant for the plurality of purchases that are made by the user during the plurality of on-line shopping sessions requires a prior authorization, received from the user prior to the plurality of purchases being made, to collect the reclassified reimbursement amount from the second financial institution of the user in response to the user not having sufficient funds at the first financial institution of the user.

12. The machine-readable medium of claim 11, wherein the first financial institution of the user comprises a banking financial institution.

13. The machine-readable medium of claim 11, wherein the prior authorization, received from the user prior to the plurality of purchases being made, to collect the reclassified reimbursement amount from the second financial institution of the user in response to the user not having sufficient funds at the first financial institution of the user further comprises a prior authorization to collect the reclassified reimbursement amount and a second financial institution fee from the second financial institution of the user in response to the user not having sufficient funds at the first financial institution of the user.

14. The machine-readable medium of claim 9, wherein the attempting to collect the reimbursement amount is in response to the reimbursement amount exceeding a maximum amount.

15. The machine-readable medium of claim 9, wherein the attempting to collect the reimbursement amount is in response to the expiration of a predetermined amount of time.

16. The machine-readable medium of claim 9, wherein the authorization to collect the reimbursement amount is received prior to the plurality of purchases being made.

17. An on-line payment service system, comprising:

means for transmitting payments to at least one merchant for a plurality of purchases that are made by a user during a plurality of on-line shopping sessions;

means for receiving an authorization to collect a reimbursement amount from a first financial institution of the user, wherein the reimbursement amount is at least equal to a portion of a cumulative amount of the payments transmitted to the at least one merchant for the plurality of purchases made by the user during the plurality of on-line shopping sessions;

means for attempting to collect the reimbursement amount in a single transaction from the it financial institution of the user subsequent to the transmitting of the payments to the at least one merchant for the plurality of purchases made by the user during the plurality of on-line shopping sessions; and means for receiving, in response to attempting to collect the reimbursement amount from the first financial institution, a collection denial from the first financial institution;

means for reclassifying the reimbursement amount in response to the collection denial to create a reclassified reimbursement amount that is associated with insufficient funds at the first financial institution;

means for collecting the reclassified reimbursement amount in a single transaction by the payment service provider from second financial institution of the user, wherein the second financial institution is a credit financial institution;

means for paying a fee to the financial institution of the user that is based on the single transaction carried out to collect the reclassified reimbursement amount.

18. The system of claim 17, further comprising:

means for reviewing a user history; and means for determining a maximum amount for the reimbursement amount, wherein payments to the at least one merchant for the plurality of purchases that are made by the user during the plurality of on-line shopping sessions are not transmitted if those payments will cause the reimbursement amount to exceed the maximum amount, and wherein the maximum amount is based on the user history.

19. The system of claim 17, wherein attempting to collect the reimbursement amount is in response to the reimbursement amount exceeding a maximum amount.

20. The system of claim 19, wherein attempting to collect the reimbursement amount is in response to the expiration of a predetermined amount of time.

* * * * *